United States Patent
Shida et al.

(10) Patent No.: US 6,595,760 B2
(45) Date of Patent: *Jul. 22, 2003

(54) STATOR ASSEMBLY FOR A REFRIGERANT COMPRESSOR HAVING COILS WOUND TO THE STATOR TEETH

(75) Inventors: Yoshiharu Shida, Fuji-gun (JP); Yoshiaki Inaba, Fuji (JP); Kiyotaka Kawamura, Numazu (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,338

(22) Filed: Apr. 9, 1998

(65) Prior Publication Data

US 2002/0057971 A1 May 16, 2002

(30) Foreign Application Priority Data

Apr. 11, 1997 (JP) ............................................. 9-093768

(51) Int. Cl.$^7$ .............................. F04B 35/04; H02K 3/00
(52) U.S. Cl. ................................. 417/410.1; 417/423.7; 310/194; 310/216
(58) Field of Search ........................... 417/410.1, 423.7, 417/366, 410.3; 310/194, 216, 218

(56) References Cited

U.S. PATENT DOCUMENTS

| 3,339,097 A | * | 8/1967 | Dunn .......................... 310/194 |
| 3,634,873 A | | 1/1972 | Nishimura .................. 318/254 |
| 4,745,345 A | * | 5/1988 | Petersen ..................... 318/254 |
| 5,653,909 A | * | 8/1997 | Muraki et al. ................ 252/68 |
| 5,666,015 A | * | 9/1997 | Uchibori et al. ............. 310/261 |
| 5,782,618 A | * | 7/1998 | Nishikawa et al. ...... 417/410.3 |

FOREIGN PATENT DOCUMENTS

| GB | 842157 | * | 7/1960 | ................. 310/218 |
| JP | 405044672 A | * | 2/1993 | ................. 310/218 |
| JP | 7-264834 A | * | 10/1995 | ................. 310/218 |
| WO | WO 90/10335 | * | 9/1990 | ................. 310/194 |

* cited by examiner

Primary Examiner—Charles G. Freay
(74) Attorney, Agent, or Firm—Pillsbury Winthrop LLP (57) ABSTRACT

A compressor including a compressing mechanical unit which inhales a refrigerant excluding chlorine, compresses the refrigerant, exhales the compressed refrigerant, and collects a refrigerating machine oil O compatible with the refrigerant, thereby lubricating the compressing mechanical unit with the refrigerating machine oil O. The compressor further includes an electric motor unit for driving the compressing mechanical unit. The electric motor unit includes a stator and a rotor, and is driven by an inverter. The stator includes three-phase wires and a stator core, wherein the stator core includes a yoke section and teeth sections on which the three-phase wires are wound, and the wires are wound on the teeth sections such that the wires on adjacent teeth sections have different phases.

9 Claims, 8 Drawing Sheets

MOISTURE-VOLUME RESISTIVITY

STATOR ASSEMBLY FOR A REFRIGERANT COMPRESSOR HAVING COILS WOUND TO THE STATOR TEETH

BACKGROUND OF THE INVENTION

The present invention relates to a compressor which forms a refrigerating cycle of a refrigerating machine, an air conditioner, or the like and, more particularly, to an improved winding structure of an electric motor unit of a compressor.

A compressor used in, for example, a refrigerating machine and an air conditioner includes a compressing mechanical unit for compressing a refrigerant and an electric motor unit for driving the compressing mechanical unit. The electric motor unit has a stator and a rotor.

The electric motor unit is provided with two- or four-pole three-phase coils in order to save energy and pursue comfort in a refrigerating-cycle operation. It is driven by the power supply of an inverter.

Figures 15A, 15B:
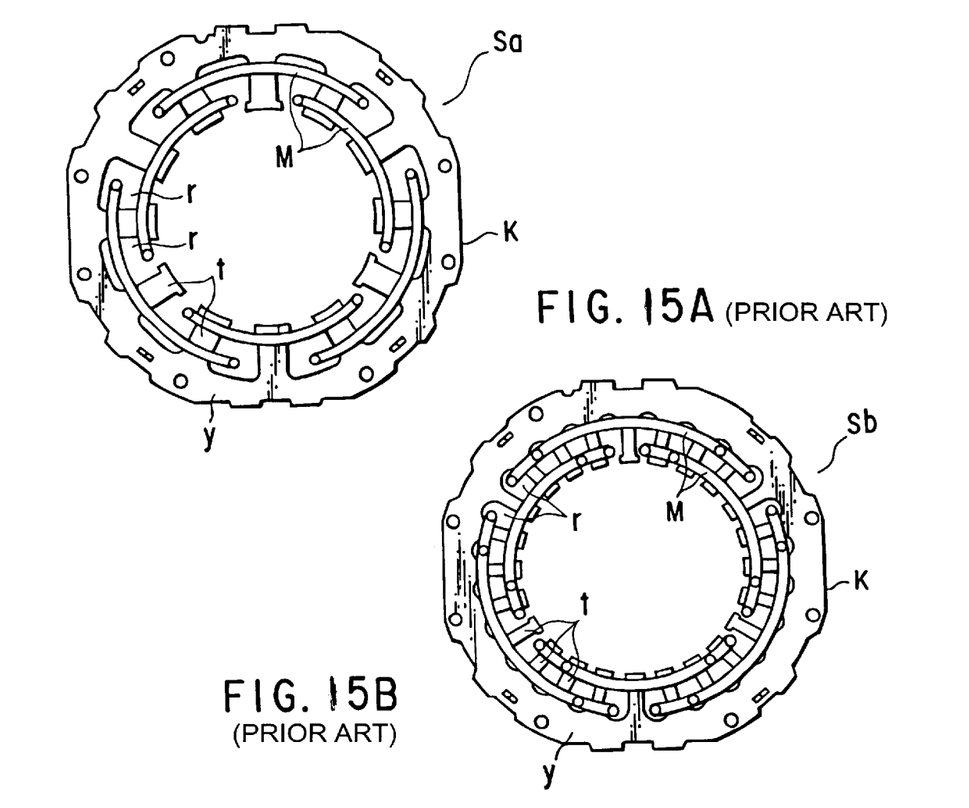
FIG. 15A is a plan view of a prior art electric motor unit.
FIG. 15B is a plan view of another prior art electric motor unit.

FIGS. 15A and 15B illustrate stators Sa and Sb, respectively. These stators are each obtained by winding a wire M on a stator core K. The core K is constituted of a ring-shaped yoke section y and teeth sections t projected from the inner wall of the yoke section y and arranged at regular intervals. The yoke section y and teeth sections t are formed integrally with each other as one component. It is well-known to call an interval between the teeth sections a slot r.

Taking into consideration the two- or four-pole three-phase coils, the number of slots r is usually 12n (n is a positive integer). The wire M is wound on the core K so as to bridge the slots r by the inserter winding method.

Since, in this winding method, the end of a coil of the wire M, which is projected from each of end faces of the stators Sa and Sb, is raised, with the result that the surface area of the coil is increased and so is the leakage current.

The leakage current is proportionate to both the chopping frequency of the inverter and the surface area of the coil. In particular, the coil end is exposed to a refrigerating machine oil (lubricant) for lubricating the compressing mechanical unit, or a liquid or gas atmosphere mixing a refrigerant and a refrigerating machine oil, which are all conditions for increasing the leakage current.

Since the coil end is large, the circumference of the coil is lengthened, thus increasing in both costs and copper loss of wire resistance. Moreover, the wire is easily damaged when it is wound or the coil end is shaped thereafter.

Recently alternative Freon (chlorofluorocarbon) excluding chlorine has been used in favor of environmental protection. There occurs a new problem in compatibility between the alternative Freon and the refrigerating machine oil supplied into the compressor.

Figure 13:
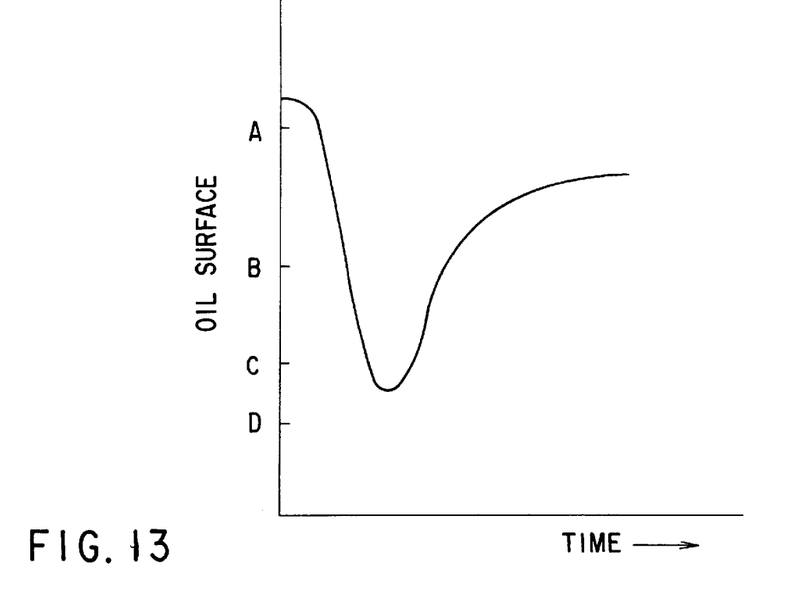
FIG. 13 is a graph showing a variation in oil surface level of refrigerating machine oil with respect to operation time.

As is apparent from the graph of FIG. 13 showing a variation in oil surface level, the level of the refrigerating machine oil varies with the refrigerant which is to be dissolved into the refrigerating machine oil as operation time elapses. There are many cases where a large amount of refrigerant is present in a sealed case particularly at the beginning of operation.

In the sealed case, the refrigerant and refrigerating machine oil are formed as two layers separated from each other, and the layer of the refrigerating machine oil of low density is formed on that of the refrigerant of high density. Part of the coil end of the lower part of the coil, which is close to the compressing mechanical unit, is soaked into the refrigerating machine oil in which the refrigerant is dissolved.

Figure 16:
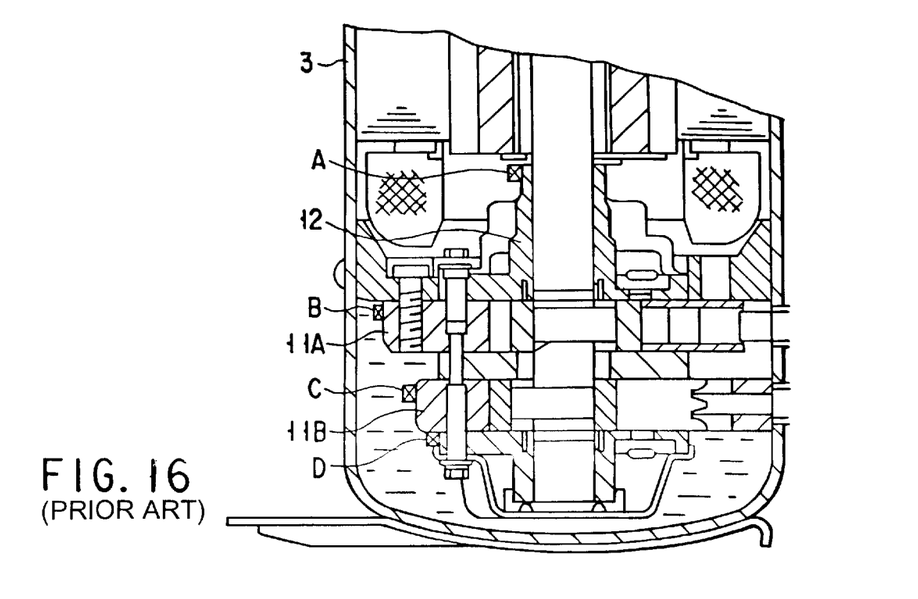
FIG. 16 is a view explaining the level of a refrigerating machine oil stored in a case.

FIG. 16 illustrates a case 3 of the compressor in order to explain the level of the refrigerating machine oil stored in the case 3. In FIG. 16, reference symbols A, B, C and D indicate oil surfaces of main bearing 12, upper cylinder 11A, lower cylinder 11B and sub-bearing 13, respectively.

Since a large amount of oil stored at the bottom of the case 3 is sucked up into each compression sliding unit by an oil pump immediately after the compressor is started, the oil is greatly reduced. If, however, the operation continues for one or two minutes, the oil circulating in a refrigerating cycle is returned to the compressor and exhaled into the case together with compressed gas; accordingly, the oil surface level is raised and stabilized between oil surfaces A and B.

Even in the steady state after the transition from the start to the normal operation of the compressor, the level of the projected coil end is high and thus part of the coil will be soaked into the refrigerating machine oil.

There is polyglycol oil, ester oil and the like as a refrigerating machine oil which is compatible with the alternative Freon. If, however, the polyglycol oil is selected, the following problem will arise. Since the volume resistivity of polyglycol oil is considerably lower than that of mineral oil which has been used conventionally, the current leaking from the electric motor unit increases greatly and thus electrical insulation deteriorates.

BRIEF SUMMARY OF THE INVENTION

An object of the present invention is to provide a compressor having an electric motor unit capable of reducing in leakage current to secure electrical insulation.

To attain the above object, there is provided a compressor comprising a compressing mechanical unit which inhales a refrigerant excluding chlorine, compresses the refrigerant, exhales a compressed refrigerant, and collects a refrigerating machine oil compatible with the refrigerant, thereby lubricating the compressing mechanical unit with the refrigerating machine oil, and an electric motor unit having a stator and a rotor, for driving the compressing mechanical unit, the stator being constituted by winding a wire on a stator core, wherein the stator core includes a yoke section and teeth sections, and the wire is directly wound on the teeth sections.

According to the present invention, the wire wound around the stator core, especially the coil end is made compact, with the result that the current leaking from the coil end is reduced to improve in electrical insulation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate preferred embodiments of the invention. The drawings together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
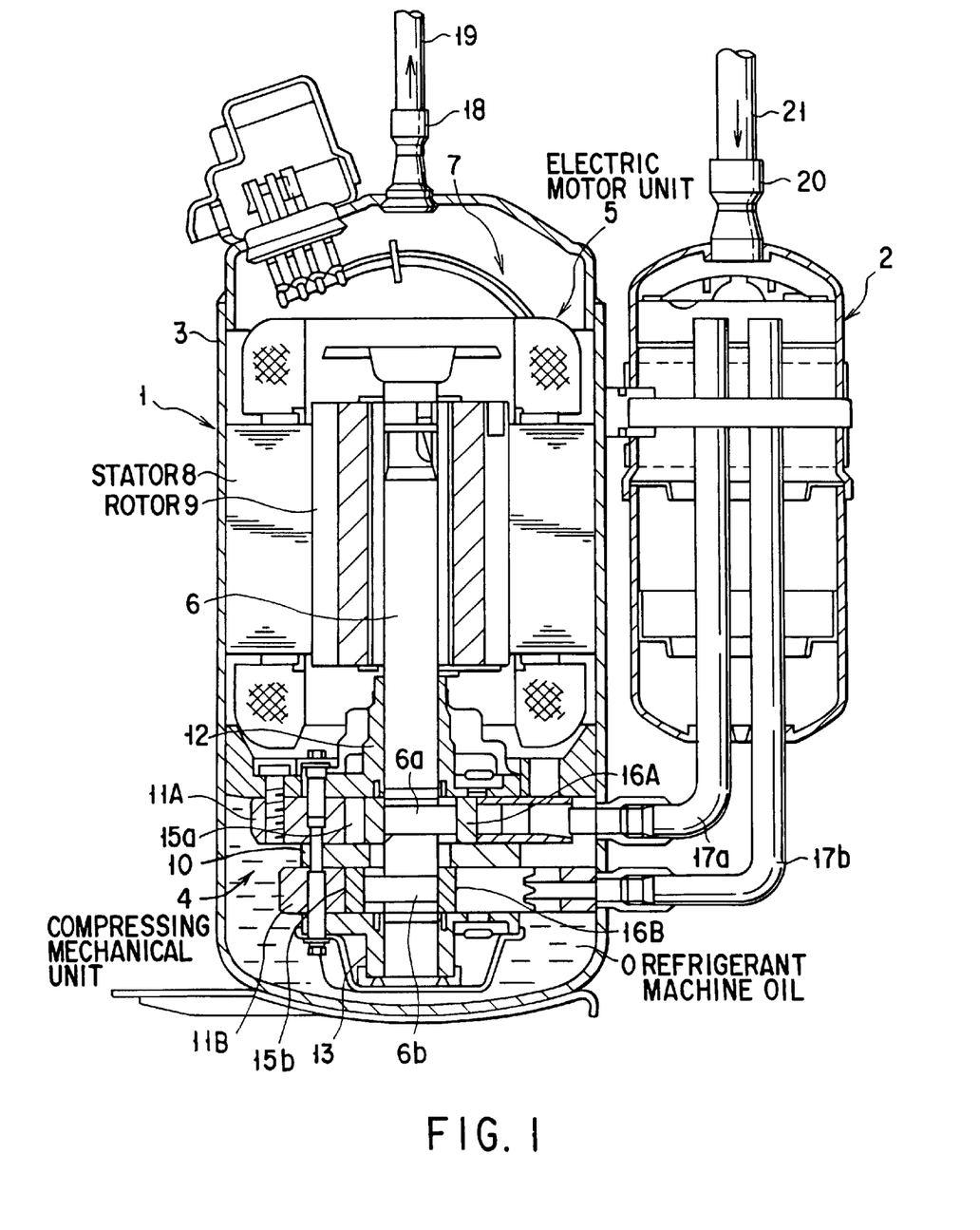
FIG. 1 is a vertical, sectional view of a rotary, sealed type compressor according to an embodiment of the present invention.

Referring to FIG. 1, reference numeral 1 indicates a sealed compressor and numeral 2 denotes an accumulator. The compressor 1 and accumulator 2 form a refrigerating cycle of, e.g., an air conditioner.

It is a refrigerant excluding chlorine, such as a hydrofluorocarbon (HFC) refrigerant, that is used in the refrigerating cycle and, for example, R410A (mixture of R32 and R125) is adopted as the HFC refrigerant.

In addition to R410A, R407C (mixture of R32, R125 and R134a), R404A (mixture of R125, R143a and R134a), R134a (single refrigerant), etc., can be used as refrigerants.

The sealed compressor 1 includes a sealed case 3. A compressing mechanical unit 4 (which will be described later) is provided in the lower part of the case 3, while an electric motor unit 5 (which will also be described later) is provided in the upper part thereof. These units 4 and 5 are coupled to each other by means of a rotating shaft 6 to constitute an electric compressing body 7.

Since a refrigerating machine oil O is collected at the inner bottom portion of the sealed case 3, almost all the compressing mechanical unit 4 is soaked into the oil. The collected oil is a lubricant of one of ester oil, polyether oil, alkylbenzene oil and Teflon oil or a mixture of two or more of these oils. The oils are all compatible with the HFC refrigerant.

In particular, the ester oil is more compatible with the refrigerant than the mineral oil, and its volume resistivity is higher than that of polyglycol oil and thus high electrical insulation can be maintained.

The electric motor unit 5 includes a stator 8 fixed on the inner surface of the sealed case 3 and a rotor 9 which is formed inside the stator 8 with a predetermined interval therebetween and into which the rotating shaft 6 is inserted.

The compressing mechanical unit 4 includes two cylinders 11A and 11B arranged vertically under the rotating shaft 6 with a diaphragm 10 therebetween. A main bearing 12 is fixed to the top of the upper cylinder 11A, and a sub-bearing 13 is attached to the bottom of the lower cylinder 11B.

The tops and bottoms of the cylinders 11A and 11B are separated from each other by the diaphragm 10, main bearing 12 and sub-bearing 13, and cylinder chambers 15a and 15b are formed in the cylinders 11A and 11B, respectively. The cylinder chambers 15a and 15b include so-called rotary compressing mechanisms 16A and 16B, respectively, for eccentrically rotating a roller in accordance with the rotation of the rotating shaft 6 and dividing each of the cylinder chambers into a high-pressure part and a low-pressure part using a vane.

The cylinder chambers 15a and 15b communicate with the accumulator 2 through conduits 17a and 17b, respectively.

An exhalation pipe 18 is connected to the top of the sealed case 3. A refrigerant pipe 19 of external piping is connected to the pipe 18 so as to communicate with a condenser (not shown) forming the refrigerating cycle of the air conditioner.

An inhalation pipe 20 is connected to the top of the accumulator 2. Another refrigerant pipe 21 is connected to the pipe 20 so as to communicate with an evaporator (not shown) forming the refrigerating cycle of the air conditioner.

An expansion mechanism is connected between the condenser and evaporator. Thus, the refrigerating cycle of the air conditioner is formed by the compressor 1, condenser, expansion mechanism, and evaporator.

Figure 2:
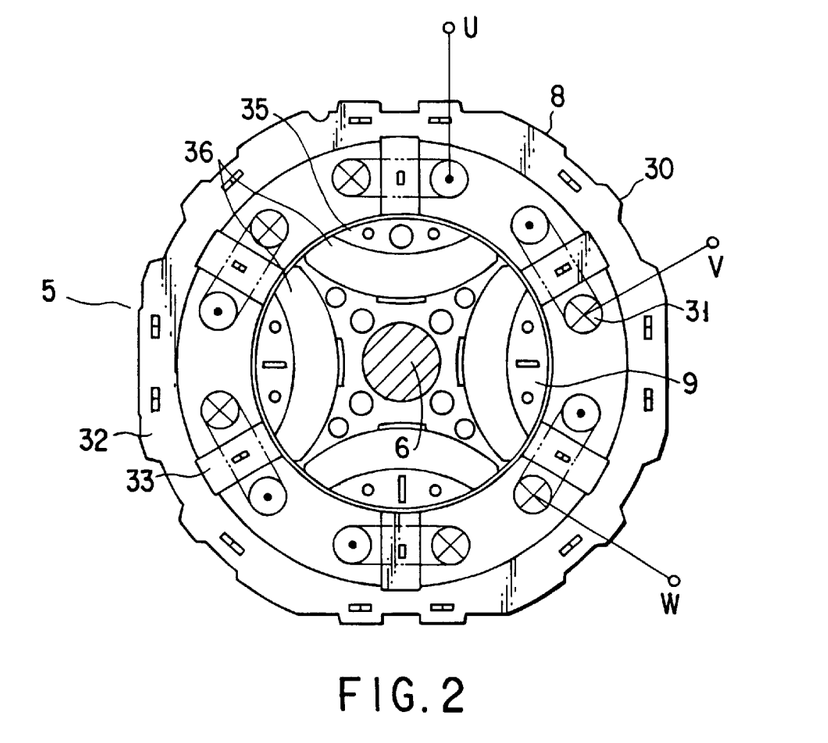
FIG. 2 is a plan view of an electric motor unit of the compressor shown in FIG. 1.

FIG. 2 is a plan view of the electric motor unit 5. The rotor 9 is arranged on the inner surface of the stator 8 with a uniform, narrow space between them, and fixed on the rotating shaft 6.

Figure 3:
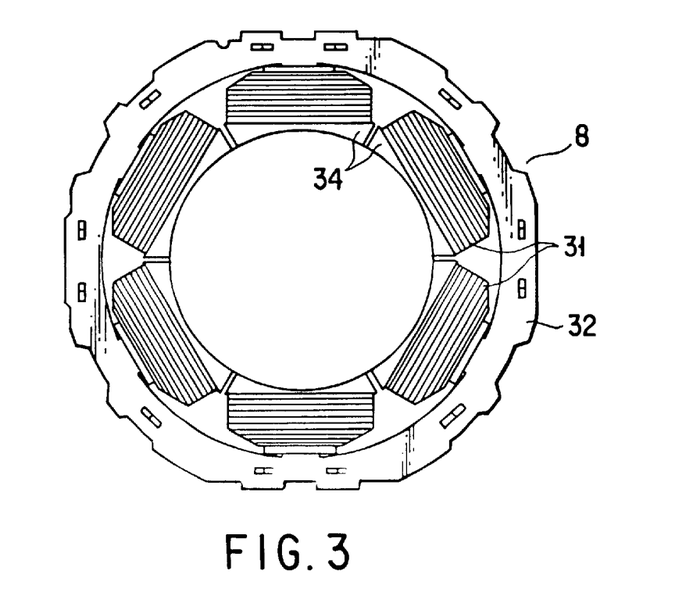
FIG. 3 is a plan view of a stator constituting the electric motor unit shown in FIG. 2.
Figure 4:
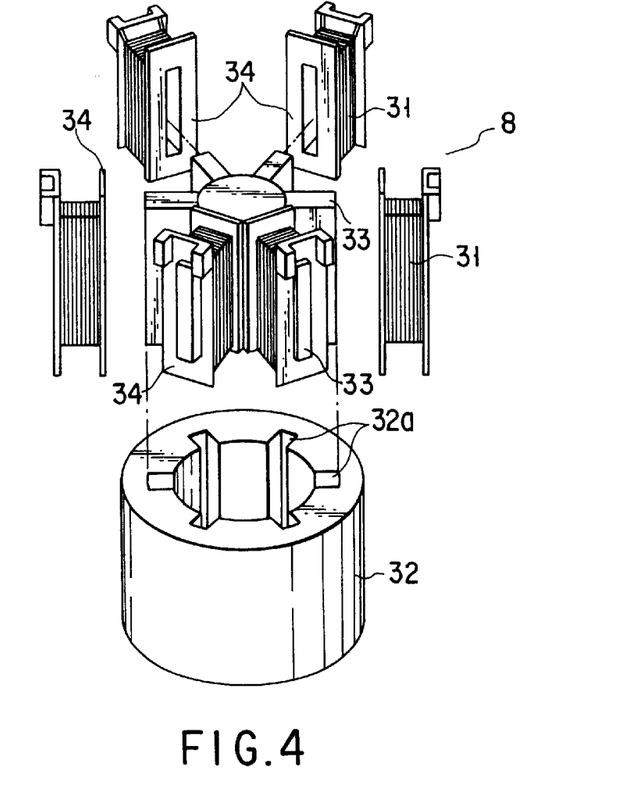
FIG. 4 is an exploded, perspective view of the stator shown in FIG. 3.
Figure 5:
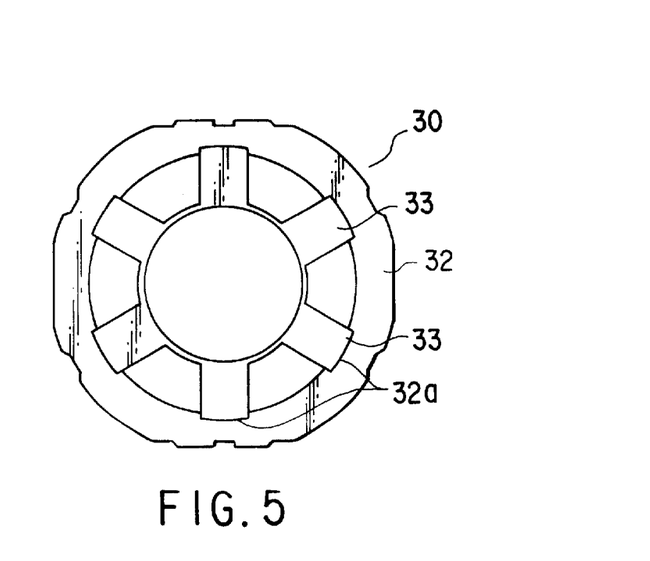
FIG. 5 is a plan view of a core of the stator shown in FIG. 4.

The stator 8 includes a stator core 30 and coils or wires 31. As illustrated in FIGS. 3 to 5, the stator core 30 is formed of layered copper plates and includes a yoke section 32 and a plurality of teeth sections 33 which can freely be separated from each other. The coils 31 are applied to the teeth sections 33 of the stator core 30.

More specifically, a plurality of engaging grooves 32a are formed in the inner surface of the yoke section 32 at regular intervals along the axis of the yoke section 32, and one side of each of the teeth sections 33 is fixed into its corresponding groove 32a.

The number of teeth sections 33 is set to 3×n (n is an integer more than 1) and, as will be described later, the coils 31 are applied directly to the teeth sections 33 so as to constitute a three-phase, four-pole motor in the teeth sections 33.

As illustrated in FIGS. 3 and 4, a plurality of spools or bobbins 34 are prepared, and a wire is wound on each of the bobbins 34 in advance. Each bobbin 34 has a rectangular opening in which the corresponding teeth section 33 is fixed.

Figure 6A:
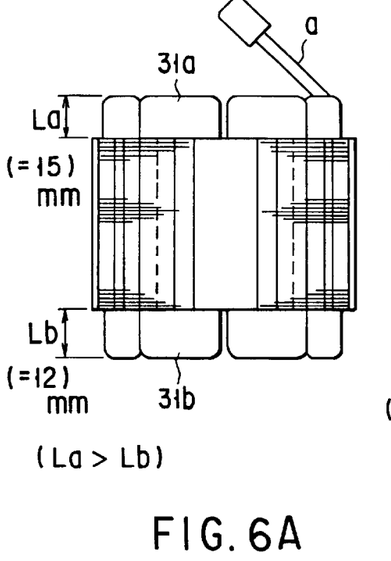
FIG. 6A is a view explaining the level of a coil end projected from the electric motor unit shown in FIG. 2.
Figure 6B:
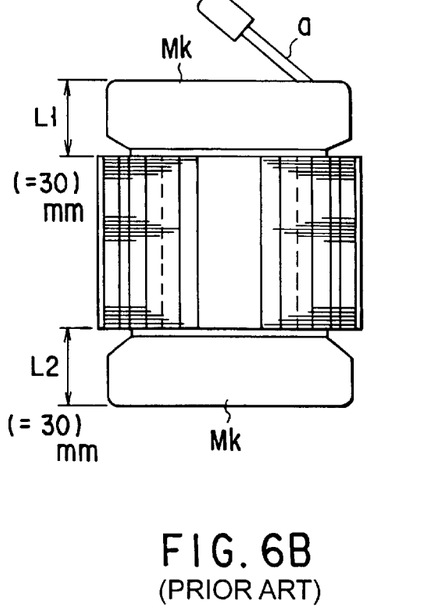
FIG. 6B is a view explaining the level of a coil end projected from a prior art electric motor unit.

Since the stator 8 is so constituted, the coil end of the coil 31, which is directly applied to the teeth section 33, is decreased in size. As shown in FIG. 6B, conventionally, the length L1 of a projected coil end Mk of the coil at its upper portion (alongside the lead wire a) is about 30 mm. In the present invention, as shown in FIG. 6A, the length La of a projected coil end 31a of the coil 31 is about 15 mm.

The length L2 of a projected coil end Mk of the conventional coil at its lower portion (on the opposite side of the lead wire a) is about 30 mm, whereas the length Lb of a projected coil end 31b of the coil 31 of the present invention is intentionally set to about 12 mm which is smaller than half the length L2.

Consequently, in the present invention, when the coils 31 are inserted into the teeth sections 33 or when the coil ends 31a and 31b are shaped after the wire is wound, the coils 31 are difficult to damage and thus the compressor can be increased in quality.

Furthermore, the length Lb of the coil end 31b, which is located alongside the compressing mechanical unit 4, is smaller than the length La of the coil end 31a, which is located on the opposite side of the unit 4 (La>Lb).

Since the compressing mechanical unit 4 is provided adjacent to the coil end 31b, even though the coil end 31b is deformed, there is no relationship between them.

Returning to FIG. 2, the rotor 9 constituting the electric motor unit (DC brush-less motor) 5 together with the stator 8, includes a yoke section 35 and a plurality of permanent magnets 36 buried in the yoke section 35 and curved like an arc. The yoke section 35 and permanent magnets 36 are assembled by a coupling section, a crank portion and an engagement section.

The structure of the rotor 9 reduces an over-current loss due to a high-frequency magnetic flux more greatly than that of a conventional rotor whose envelope is covered with a stainless can. Thus, an effective magnetic flux is increased and the electric motor unit can be improved in efficiency.

The permanent magnets 36 are shaped like an arc, and the orientation of grains in the magnets are changed from parallel orientation to radial anisotropy, thereby to locally apply a magnetic flux to a live part (mechanical angle 60°) of the coils of the stator.

As a result, the amount of effective flux is increased about 20%, and the efficiency of the electric motor unit is improved about 4% at rated time and it is done more at the time of medium- and low-speed rotation of the rotor 9 which is used more frequently in practice.

The permanent magnets 36 are constituted of rare earth magnets. Since the wire is wound on the teeth sections 33 of the stator core 30 by the series-winding method and rare earth magnets are used as the permanent magnets 36 alongside the rotor 9, the residual magnetic flux density and coercive force of the magnets are both greater than those of ferrite magnet materials, and the magnetic energy product thereof is also very great, with the result that the compressor is increased in efficiency and improved in performance.

Figure 7:
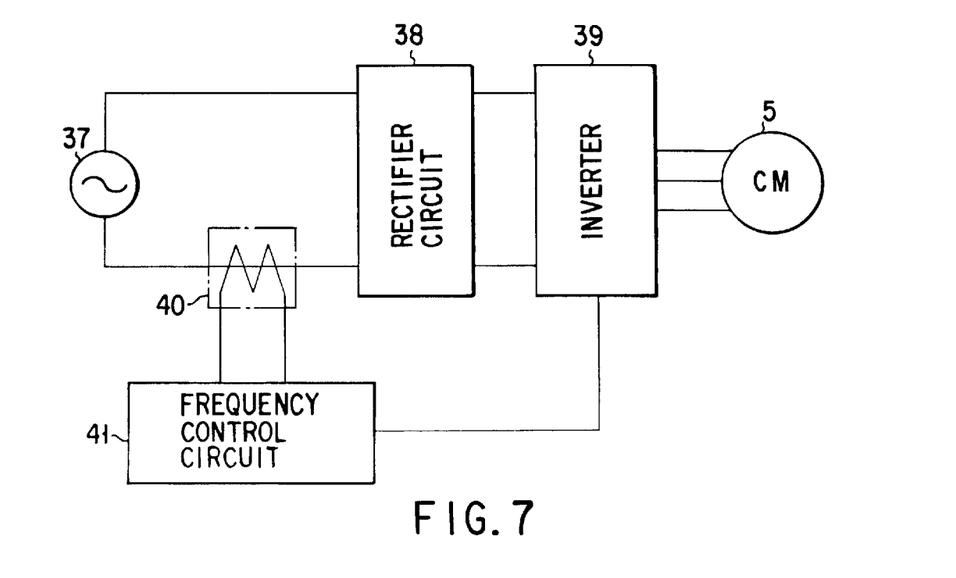
FIG. 7 is a circuit diagram of the electric motor unit shown in FIG. 2.

The compressor so constituted has an electric circuit shown in FIG. 7.

Referring to FIG. 7, the electric motor unit 5 and power supply 37, which constitute the compressor 1, are connected to each other through a rectifier circuit 38 and an inverter 39. A current detection apparatus 40 is interposed between the power supply 37 and rectifier circuit 38 and connected to a frequency control circuit 41.

The rectifier circuit 38 is designed to convert a commercial AC power supply voltage, which is sent from the power supply 37, into a DC power supply voltage.

The current detection apparatus 40 detects an amount of input current supplied to the inverter 39 through the rectifier circuit 38. When the detected amount exceeds a set value, the number of revolutions of electric motor unit 5 is decreased to prevent the input current of the unit 5 from exceeding a set allowable value.

The frequency control circuit 41 receives a detection signal from the current detection apparatus 40 and transmits an instruction signal indicative of an operating frequency to the electric motor unit 5.

Thus, the electric motor unit 5 is electrified to drive the compressing mechanical unit 4. In this unit 4, a low-pressure refrigerant gas is directly inhaled from the evaporator into the cylinder chambers 15a and 15b through the accumulator 2 and compressed in accordance with the eccentric rotation of the roller.

The refrigerant gas compressed to a predetermined pressure is discharged into the sealed case 3 and diffused therein, and then guided to the condenser through the refrigerant pipe 19. Thus, the refrigerating cycle is executed.

Moreover, as illustrated in FIG. 7, the commercial AC power supply voltage, which is sent from the power supply 37, is converted into a DC voltage, and the inverter 39 outputs a fixed frequency and applies it to the electric motor unit 5 as a three-phase output.

As shown in FIG. 2, the electric motor unit 5 turns on the coils of the stator such that only two of three phases (U, V and W phases) are electrified. Then, the frequency control circuit 41 sends a frequency instruction signal in accordance with a load of the compressor and controls the number of revolutions of the electric motor unit 5.

The current detection apparatus 40 also detects an amount of input current of the inverter 39. When the detected amount exceeds a set value, the number of revolutions of the electric motor unit 5 is decreased to prevent the input current from exceeding a set allowable value.

According to the electric motor unit 5 of the present invention, since the coils 31 are directly applied to the teeth sections 33 constituting the stator core 30, the coil ends 31a and 31b can be reduced in size, with the result that the coils 31 are decreased in length and the wire resistance is lowered (the copper loss is decreased). The electric motor unit 5 can thus be improved in efficiency.

Furthermore, the amount of current leaking from the coil ends 31a and 31b, which are exposed to a liquid or gas atmosphere of a refrigerating machine oil or a mixture of a refrigerant and a refrigerating machine oil, can be minimized, thereby increasing in reliability.

The compressing mechanical unit 4 is lubricated with a refrigerating machine oil of at least one of ester oil, polyether oil, alkylbenzene oil, and Teflon oil which are compatible with alternative Freon.

If, in particular, the ester oil is used as the principal ingredient of the refrigerating machine oil, the volume resistivity of the oil can be maintained at a high value and the leakage current can be reduced (from 0.95 mA to 0.76 mA), thereby increasing in electrical insulation.

Since, furthermore, the projected coil end 31b at the bottom of the coil 30 is short, its part is hardly soaked into the refrigerating machine oil collected at the inner bottom portion of the sealed case 3.

It is, however, necessary to consider that the oil surface is raised and part of the coil end 31b is soaked into the oil depending upon the refrigerant dissolved into the refrigerating machine oil as the operation time elapses. Naturally, high electrical insulation is required for the refrigerating machine oil.

Figure 14:
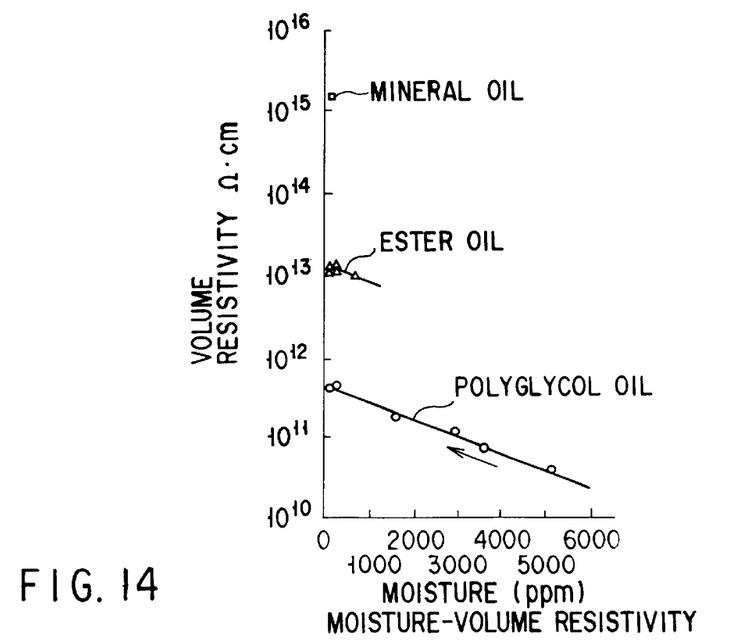
FIG. 14 is a graph of the principal refrigerating machine oils.

Since, as shown in FIG. 14, mineral oil has high insulation but is incompatible with HFC refrigerant of specific Freon, it is not practical. Though the volume resistivity of ester oil is lower than that of mineral oil, it is in enough amount for electrical insulation. The ester oil is compatible with the specific Freon and most suitable for the constitution of the electric motor unit 5. The polyglycol oil has a volume resistivity of $10^{12}$ Ω·cm or lower to increase in leakage current and is therefore impractical.

Since the stator 8 of the electric motor unit 5 is divided into the yoke section 32 constituting the stator core 30 and teeth sections 33 provided with the coils 31, it is easy to manufacture, thereby improving in workability, reducing in amount of use of copper wire, and decreasing in costs.

Moreover, since the wire is wound on the spool or bobbin 34 and the bobbin is inserted into its corresponding teeth section 33, workability is very good. No pressure need to be applied to the coils 31 and thus the coils are not damaged, thereby increasing in quality and improving in reliability.

The number of teeth sections 33 is set to 3×n (n is an integer more than 1), the coils are formed so as to constitute a three-phase, four-pole motor. Adjacent coils have different phases, and one of three phases is always in a non-conductive state. Therefore, the distribution of rotating magnetic fields (magnetic attraction) is not biased, and no oscillation occurs.

Since the electric motor unit 5 is driven by the inverter, the operating frequency of the unit 5 is so controlled as to be always set in the optimum state in accordance with a load.

The permanent magnets 36 are incorporated into the rotor 9, and rare earth magnets are used as materials therefor. Since the magnetic energy of the rare earth magnets is higher than that of ferrite magnets, the compressor is increased in efficiency and improved in performance.

In each of the coils 31, the length Lb of the projected coil end 31b, which is located alongside the compressing mechanical unit 4, is smaller than the length La of the coil end 31a, which is located on the opposite side of the compressing mechanical unit 4. Thus, a sufficient wide gap is secured between the compressing mechanical unit 4 and coil end 31b to prevent the coils from being soaked into the refrigerating machine oil O.

Figure 8:
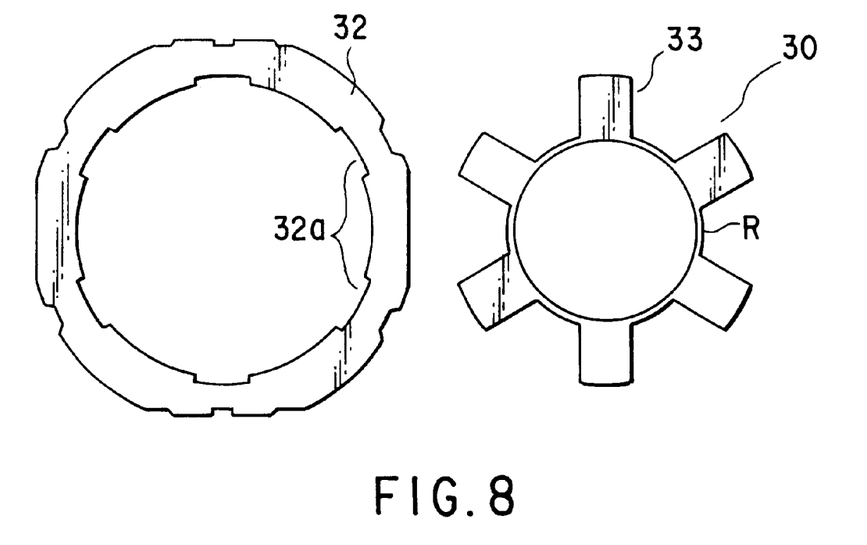
FIG. 8 is an exploded, plan view of the core of the stator of the electric motor unit shown in FIG. 2.

FIG. 8 illustrates a stator core 30 which is divided into a yoke section 32 and teeth sections 33 fixed into their corresponding grooves 32a of the yoke section 32. That is, the core 30 is divided into two parts.

A ring-shaped section R is formed on the inner surfaces of the teeth sections 33 so as to connect the teeth sections 33 to each other. In this constitution, since the ring-shaped section R and teeth sections 33 are formed integrally as one component, the teeth sections 33 can easily be fitted into the yoke section 32.

When the bobbin 34 wound with the wire is inserted into the teeth sections 33, it can reliably be held in a predetermined position by the ring-shaped section R. Moreover, the teeth sections 33 can be formed so as to have the same angle between adjacent ones, and the precision of roundness of the inner surface of the teeth section can be improved; therefore, a uniform interval between the teeth sections 33 and rotor 9 can be maintained.

Figure 9:
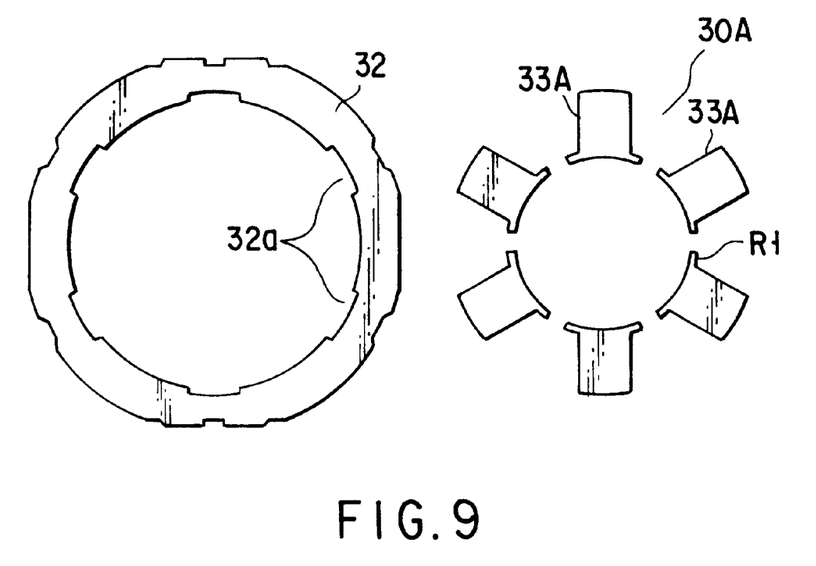
FIG. 9 is an exploded, plan view of a stator core of an electric motor unit according to another embodiment of the present invention.

FIG. 9 illustrates another stator core 30A having a yoke section 32 and a teeth section which is divided into a plurality of sections 33A. The plurality of teeth sections 33A are formed so as to correspond to grooves 32a formed in the yoke section 32.

In the constitution of the stator core 30A, a ring-shaped piece R1 is formed on the inner surface of the teeth section 33A. A uniform space between the inner surface of the ring-shaped piece R1 and the rotor is formed and, as in the constitution shown in FIG. 8, the bobbin 34 can be held in a predetermined position.

Figure 10:
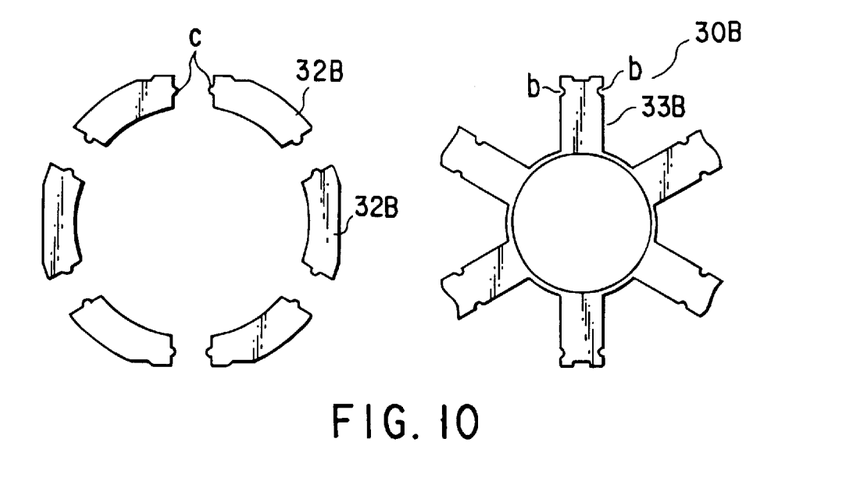
FIG. 10 is an exploded, plan view of a stator core of an electric motor unit according to yet another embodiment of the present invention.

FIG. 10 shows another stator core 30B including teeth sections 33B and a yoke section 32B. The end portion of each of the teeth sections 33B extends to the circumference of the stator core. The yoke section 32B is divided into a plurality of sections and each has engagement projections c engaged in grooves b formed in the teeth sections 33B.

Figure 11:
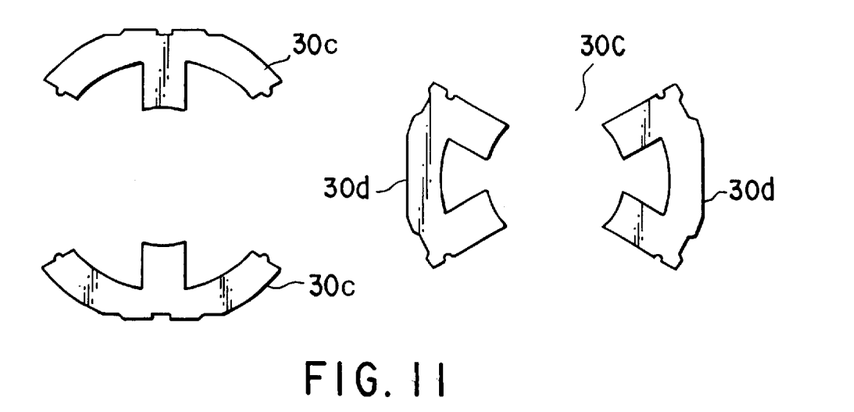
FIG. 11 is an exploded, plan view of a stator core of an electric motor unit according to another embodiment of the present invention.

FIG. 11 illustrates a four-divided stator core 30C of two pairs of stator cores 30C and 30d whose yoke and teeth sections are partly integrated with each other.

Figure 12:
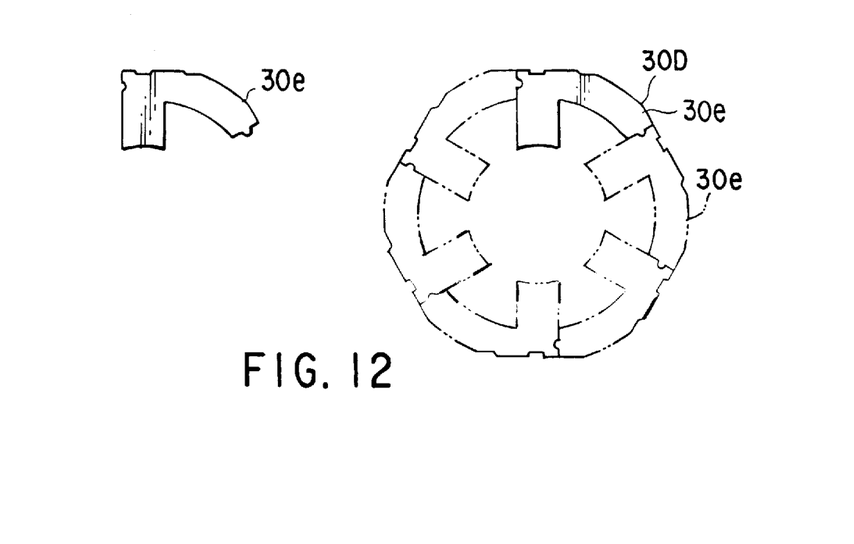
FIG. 12 is an exploded, plan view of a stator core of an electric motor unit according to another embodiment of the present invention.

FIG. 12 illustrates a six-divided stator core 30D having stator cores 30e whose yoke and teeth sections are partly integrated with each other.

The stator cores 30 to 30D illustrated in FIGS. 8 to 12 create predetermined effects without degrading the conditions of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compressor comprising:
   a case configured to collect a refrigerating mechanical oil compatible with a refrigerant at a bottom portion thereof;
   a compressing mechanical unit positioned in the case; and
   an electric motor unit have a stator and a rotor, the electric motor unit being positioned within the case, which drives the compressing mechanical unit,
   the compressing mechanical unit inhaling a refrigerant excluding chlorine, compressing the refrigerant, and exhaling the compressed refrigerant, and the compressing mechanical unit being lubricated with the refrigerating mechanical oil,
   wherein
      the stator includes a yoke having teeth sections on which three-phase wires are wound, the electric motor unit being driven by an inverter, the wires being wound on the teeth sections such that the wires on adjacent teeth sections have different phases, and
      the stator coil is constructed and arranged so as to be sufficiently compact so that a coil end of the stator coil, during operation is spaced at a distance which avoids immersion in refrigerating mechanical oil so as to minimize electric current leaking from the electric motor unit.

2. The compressor according to claim 1, wherein the refrigerating machine oil collected in the compressing mechanical unit includes one of ester oil, polyether oil, alkylbenzene oil and Teflon oil or a mixture of two or more of the ester oil, polyether oil, alkylbenzene oil, and Teflon oil.

3. The compressor according to claim 1, wherein the stator insludes a stator core including at least two yoke sections having teeth sections.

4. The compressor according to claim 1, wherein the wires are wound on a plurality of bobbins in advance, and bobbins are inserted into respective teeth sections.

5. The compressor according to claim 1, wherein the number of the teeth sections is set to 3×n, n being an integer greater than 1, and one of the phases of the three-phase wires wound on the teeth sections such that the adjacent teeth sections have different phases is always in a non-conductive state.

6. The compressor according to claim 1, wherein the rotor includes permanent magnets therein.

7. The compressor according to claim 6, wherein the permanent magnets are formed of rare earth magnets as materials for the magnets.

8. The compressor according to claim 1, wherein a length of a projected coil end of the wires, which is located closer to the compressing mechanical unit, is smaller than a length of another projected coil end thereof which is located farther from the compressing mechanical unit.

9. The compressor according to claim 6, the permanent magnets are constituted such that a magnetic flux is locally applied to a live part of the wires of the stator.

* * * * *